United States Patent Office

3,429,769
Patented Feb. 25, 1969

3,429,769
ARTICLE AND PROCESS FOR THE PRODUCTION OF BONDS BETWEEN METALS AND ELASTOMERS
Jakob Ippen, Cologne-Flittard, and Erwin Alfons Müller, Leverkusen, Germany, assignors to Farbenfabriken Bayer Aktiengesellschaft, Leverkusen, Germany, a German corporation
No Drawing. Filed July 9, 1963, Ser. No. 293,656
Claims priority, application Germany, July 12, 1962, F 37,296
U.S. Cl. 161— 217      5 Claims
Int. Cl. B32b 25/16; C09j 3/12

ABSTRACT OF THE DISCLOSURE

A method and the resulting article of adhering a vulcanizable rubber to a metallic base including in order the metallic base, a layer of chlorinated elastomer adhered to said base and a layer including a copolymer of butadiene with methyl methacrylate bonded to said elastomer and said vulcanizable rubber. The rubbery layers are superimposed in the above order upon the base and the assembly is vulcanized at a suitable temperature.

---

This invention relates to a method of adhering vulcanizable rubber to any metallic material and to the composite products that are so produced.

It is known to use synthetic copolymers of butadiene and methacrylic acid in order to produce vulcanized bonding layers between steel and natural rubber and, with certain limitations, also butadiene-styrene rubbers. The bonding is effected in this case by way of the carboxyl groups of the methacrylic acid, which are able to form hydrogen bridge bonds with active centres of the metal surface.

Furthermore, it is known that bonding layers of chlorinated rubber impart a more or less effective adhesion between metals and natural or synthetic elastomers, the strength of such adhesion being dependent on the nature of the rubber and of the metal. In addition, it is also known that mixtures of chlorinated rubber and degraded rubber mixtures of chlorinated rubber and poly-1,3-dichlorobutadiene, as well as mixtures of rubber and an up to 10 percent chlorinated styrene-butadiene rubber, are suitable for bonding rubber to metals.

It has now been found that particularly rigid bonds between metallic materials and vulcanizable rubbery materials, i.e. vulcanizable natural or synthetic elastomers can be produced by using, as bonding agent, copolymers of conjugated dienes with acrylates in combination with chlorinated elastomers, and by subjecting the parts to be bonded to a vulcanization.

By the term vulcanizable rubbery material respectively natural or synthetic elastomers, as used herein, there are to be understood those products which are based on natural rubber or synthetic rubber of various types, the latter for example based on butadiene, isoprene or chloroprene homopolymers or copolymers with the various types of copolymerizable components, for example acrylonitrile, styrene and others, and in addition also special products, for example silicone rubbers and stereospecific diene polymers. The process of this invention, however, is of preferred interest for bonding metallic materials with vulcanizable rubbery materials which represent polymerization products of conjugated aliphatic diolefines with 4 to 6 carbon atoms, said polymerization products containing at least 60 percent by weight of copolymerized diolefine. Specific types are for example monopolymers of butadiene, homopolymers of isoprene as well as natural rubber, copolymers of butadiene with styrene or acrylonitrile (with a butadiene-content of at least 60 percent, preferably 70 percent) or polychloroprene.

The expression "metallic materials" is to be understood to cover here metals and metal alloys as used for shaped articles (commodities) of most different types and different purposes, such as iron, zinc, aluminum, copper, etc. and alloys of these metals such as brass, bronze, aluminium-magnesium alloys etc.

Polymers to be employed as one of the components to be applied in the process according to the invention are copolymers of conjugated diolefins and acrylates, more specifically esters of acrylic or methacrylic acid with saturated aliphatic alcohols having from 1 to 4 carbon atoms. Although it is preferable to use methyl methacrylate for this purpose, it is in principle possible to use the aliphatic ester homologues thereof as well as those of methyl acrylate, if desired with branched ester components. Examples of such compounds include the ethyl ester, propyl ester, isopropyl ester and butyl ester of methacrylic acid. Conjugated diolefines may in general be used as copolymerization components in particular aliphatic diolefines with up to 8 carbon atoms which may be substituted. Examples include 1,3-butadiene, 2-methyl 1,3-butadiene, 2-chloro 1,3-butadiene, 2,3-dimethyl 1,3-butadiene.

In the copolymers of conjugated diolefines and acrylates which are to be used according to the invention, the proportion of the acrylate component can vary over a wide range, for example between 10 and 90 percent. Particularly, favourable effects are produced with a proportion between 40 and 70 percent.

The chlorinated elastomers to be used together with copolymers of conjugated dienes with acrylic or methacrylic acid esters as bonding agent are formed by chlorination of rubbery materials of the natural and synthetic elastomers type. By natural or synthetic elastomers, there are to be understood here products which are based on natural rubber or synthetic rubbers of various types, the latter being for example based on butadiene or isoprene or chloroprene homopolymers or copolymers with the various types of copolymerizable components, for example, acrylonitrile, styrene and others, as well as stereospecific diene polymers. Of particular interest are chlorination products with a chlorine content of at least 40 percent, advantageously chlorination products with at least 60 percent of chlorine.

The most important embodiment of this invention, respectively the method yielding optimum results, consists in:

(1) Applying to the surface of the metalic material (a) a layer of a chlorinated elastomer being selected from the group consisting of the chlorination products of natural rubber, polybutadiene, polyisoprene and polychloroprene and having a chlorine content of at least 60 percent by weight, and (b) applying to this layer of a chlorinated elastomer a layer of an acrylate copolymer, the latter representing a copolymer of 40–70 percent by weight of methylmethacrylate with butadiene;

(2) Contacting the so treated metal surface with the rubbery material to be bond to said metal and (3) Vulcanizing the so obtained compoosite structure at temperatures between 110 and 180° C.

According to another variant of this invention these bondings between metal and rubbery material may be produced by applying to the metal a layer of the chlorinated rubber and applying to the rubbery material to be united with a layer of the acrylate copolymer and thereafter pressing the two parts together and subjecting them to vulcanization.

The copolymers to be used as adhesion promoters according to the process of the invention are prepared by known methods. Various polymerization methods may be used. For example, the polymerization can be conducted both in substance, in solution and in emulsion.

With polmerization in substance or in solution, both radical and ionic polymerization can be utilized. For radical polymerization processes, the initiators normally employed for this purpose may be used, for example, inorganic and organic per compounds, such as, for example alkali metal persulphates, perborates, acyl peroxides such as benzoyl peroxide, alkyl hydroperoxides and other per compounds. Redox systems may also be used for example of peroxides and pyrosulphites, etc., and azo compounds, such as for example azodiisobutyronitrile. The temperatures used are generally between 5 and 50° C.

Regulators normally employed for these polymerization processes, such as for example long-chain alkyl mercaptans, dialkyl xanthogen disulphides and other regulators can likewise be employed in the present process. It is especially advantageous with ionic polymerization in substance or in solvents, to conduct the polymerization in such a way by suitable regulation, for example by adding ethers, that products are obtained which have good solubility in suitable solvents, advantageously aromatic solvents.

With solution polymerization, solvents may be used which are normally used for this purpose for example, aromatic hydrocarbons, aliphatic esters, dioxane, tetrahydrofuran or mixtures thereof.

With emulsion polymerization, one may use practically all the emulsifiers which can be employed, that is to say, both anionic emulsifiers, such as salts of alkyl sulphuric acid esters, salts of alkyl sulphonic acids, salts of sulphonated oils, salts of fatty acid condenzation products with amino- or oxyalkyl-sulphonic acid, as well as cationic emulsifiers, such as, for example, salts of alkylamines and inorganic or organic acids, and also finally non-ionic emulsifiers, such as, for example, reaction products of ethylene oxide with phenols and other substances.

After completing polymerization, stabilizers known in connection with the production of synthetic rubbers may be added, for example phenyl-$\beta$-naphthylamine or bis-(3-cyclohexyl-5-methyl-2-oxyphenyl)-methane.

Furthermore, it has been found in particular that particularly rigid bonds between metals and elastomers can be produced by using, for the adhesion promoter combination according to the present invention and as copolymer component, a component comprising a conjugated diolefine being selected from the group consisting of butadiene and isoprene and the methyl ester of methacrylic acid, the copolymerization of these components in emulsion being effected in such a way that to the total quantity of the butadiene-hydrocarbon initially added there are at first only added 40–60 percent by weight of the acrylate monomer to be introduced, this proportion is polymerized to 40–70 percent and then final polymerization is effected after the residual quantity of acrylate component has been added, either continuously or portionwise. As polymerization initiators, it is advantageous in this case to use Redox systems, more especially those based on hydroperoxides and polyamines, with simultaneous use of salts of isomerized abietic acid as emulsifier.

The chlorinated polymers to be used according to the present process are produced by known methods and the various types of chlorination methods may be considered for this purpose. The chlorination can for example be carried out in suspension, in emulsion, in solution or even in substance.

As well as using chlorine as chlorinating agent, it is also possible to employ the known agents which split off chlorine, such as the sulphonic acid or carboxylic acid amides which are substituted on the nitrogen atom by chlorine. In order to accelerate the chlorination, it is also possible to add chlorination catalysts, such as iron chloride, aluminum chloride or iodine. The chlorination can also be activated by light radiation, more especially with light having a high content of ultra-violet rays. Agents which combine with the acid formed by the chlorination can also be added, such as, for example sodium carbonate, sodium bicarbonate, sodium acetate, etc.

The bond between the metals to be united and natural or synthetic elastomers normally are produced by coating the metal with a solution of the chlorinated elastomer and subsequently (after drying) with a solution or emulsion of the acrylate copolymer. According to another variant the bonding may be produced by coating the metal to be united with a solution of the chlorinated rubber and coating the rubbery material to be united with a solution or an emulsion of the acrylate copolymer, pressing the two parts together and then subjecting them to vulcanization.

Suitable solvents include aromatic hydrocarbons, such as benzene, toluene, xylene, chlorinated aliphatic substances such as trichlorethylene, chloroform, etc., ketones such as methylethylketone, esters such as ethyl acetate, etc., as well as mixtures of the aforesaid solvents with one another. The solid content of the solutions to be used can vary within wide limits, for example between approximately 2 and 20 percent, but advantageously solutions with a solid content between 5 and 10 percent are employed.

The aforesaid acrylate-diolefine copolymers can be used within a wide range with the said chlorinated elastomers. The ratio between copolymers based on acrylate with conjugated diolefines and chlorinated elastomer should advantageously be between 1:3 and 3:1.

For the vulcanization temperatures usually employed for vulcanizing natural or synthetic elastomers and advantageouly temperatures between 110° and 180° C. are employed, the vulcanization times depending the vulcanization temperature and on the nature and thickness of the materials to be united.

Known latex auxiliaries of both low molecular weight and high molecular weight, such as, for example, polyvinyl alcohol, casein and other auxiliaries may be added to the emulsions, for example to influence the viscosity, stability, drying time or the flow properties.

The co-use of organic isocyanates or substances splitting off isocyanate, i.e. compounds which liberate NCO groups on heating and which are obtainable for example from polyvalent isocyanates and phenols, also provides a further improvement in a majority of cases.

The polymer mixtures to be used as bonding agents according to the present invention can in principle be employed without addition of normal vulcanization auxiliaries. On the other hand, the addition of vulcanizing agents such as sulphur, sulphur-yielding substances, tetramethyl thiuram disulphide, zinc oxide and accelerators or organic peroxides, polyisocyanates and age resisters, plasticisers and loading agents to the solutions or emulsions of the polymer mixtures is not detrimental to the strength of the bonds which are produced.

Using the said copolymers and chlorinated rubber, it is possible for metals such as zinc, iron, aluminium and metal alloys such as brass and bronze to be vulcanized to natural and synthetic rubber. The process is of particular importance for vulcanizing metals to butadiene-styrene rubbers, which have been produced by the cold polymerization process with isomerized abietic acid as emulsifier and which normally can only be bonded with difficulty to metals. The vulcanizing of such butadiene-styrene rubbers to metals is for example not possible with polyisocyanates, whereas the present process provides very firm unions.

The parts referred to in the following are parts by weight, unless otherwise indicated:

(I) Production of the copolymers to be used and based on conjugated diolefines (A) 184 parts of water, 3.4 parts of potassium salt of disproportionated abietic acid, 0.4 part of trisodium phosphate and 0.3 part of tetraethylene pentamine are initially placed in a vessel. After removing the oxygen from the vessel by nitrogen, 0.1 part of mixed, tertiary, long-chain mercaptans, 23 parts of methyl methacrylate and 50 parts of butadiene are forced under pressure, the vessel is cooled to 5° C. and, at this temperature, 0.3 part of cumene hydroperoxide dissolved in 2 parts of methyl methacrylate are added. With 17 g. of polymer per 100 g. of latex, the residual 25 parts of methyl methacrylate are added. Polymerization takes place until 34 g. of polymer per 100 g. of latex are reached. The mixture is then stabilized with 1.5 parts of bis-(3-cyclohexyl-5-methyl - 2 - oxyphenyl)-methane and degasified. The latex thus obtained can be precipitated with a common salt solution and the dried precipitate dissolved in aliphatic or aromatic solvents.

(B) 175 parts of water, 3.4 parts of isomerized potassium abietate, 0.4 part of trisodium phosphate and a solution of 9.1 parts of water, 0.1 part of the sodium salt of ethylene diamine tetracetic acid, 0.24 part of normal sulphuric acid, 0.003 part of ferrosulphate and 0.12 part of sodium formaldehyde sulphoxylate are mixed initially. After removing the oxygen from the vessel, 0.5 part of mixed tertiary mercaptans ($C_{10}$–$C_{14}$), 23 parts of methyl methacrylate and 50 parts of butadiene are added, the vessel is cooled to 5° C. and, at this temperature, a solution of 0.14 part of cumene hydroperoxide in 2 parts of methyl methacrylate are added. At 17 g. of polymer per 100 g. of latex, another 25 parts of methyl methacrylate are added. Polymerization takes place until 34 g. of polymer per 100 g. of latex are reached, then stabilization is effected with 1.5 parts of bis-(3-cyclohexyl-5-methyl-2-oxyphenyl)-methane and the mixture is then degasified. The latex obtained in this way can be precipitated with a common salt solution and the dried precipitate dissolved in adiphatic or aromatic solvents.

(C) Production takes place as in Example B, but 50 parts of methyl acrylate instead of 50 parts of methyl methacrylate are used.

(D) Production is carried out as in Example B, but 50 parts of isoprene are used instead of 50 parts of butadiene.

(E) Production takes place as in Example B, but 50 parts of butyl acrylate are used instead of 50 parts of methyl methacrylate.

(F) Production takes place as in Example A, but the 3.4 parts of isomerized potassium abietate are replaced by (a) 3.2 parts of potassium salt of coconut fatty acid, or (b) 3.2 parts of sodium dodecyl sulphonate or (c) 1.0 part of potassium salt of coconut fatty acid and 2.5 parts of sodium diisobutyl naphthalene sulphonate.

(G) Production takes place as in Example A, the methyl methacrylate being supplied in analogous manner in two equal proportions, but the monomers are used in a modified ratio, as set out below; (a) 30 parts of methyl methacrylate and 70 parts of butadiene, (b) 45 parts of methyl methacrylate and 55 parts of butadiene, (c) 60 parts of methyl methacrylate and 40 parts of butadiene.

(H) 176 parts of water, 3.5 parts of sodium dodecyl sulphonate, 0.2 part of potassium persulphate and 4 parts of methacrylamide are mixed. 23 parts of methyl methacrylate, 0.3 part of mixed tertiary mercaptans ($C_{10}$–$C_{14}$) and 46 parts of butadiene are added and the mixture heated to 50° C. With 17 g. of polymer per 100 g. of latex, another 27 parts of methyl methacrylate are added. When 35 g. of polymer per 100 g. of latex are reached, stabilisation is effected with 1.0 part of bis-(3-cyclohexyl-5-methyl-2-oxyphenyl)-methane and the mixture is then degasified. The latex thus obtained can be precipitated with a common salt solution and the dried precipitate dissolved in aliphatic or aromatic solvents.

(I) Production is effected as in Example H, but 4 parts of methacrylic acid are used instead of 4 parts of methacrylamide.

(K) Production is effected as in Example H, but the 50 parts of methyl methacrylate are introduced all at once at the start of polymerization.

(L) Production takes place in a manner analogous to Example H, using the following quantities: 176 parts of water, 1.0 part of potassium salt of coconut fatty acid, 2.3 parts of sodium diisobutyl sulphonate, 0.7 part of sodium dinaphthyl methane sulphonate, 27 parts of methyl methacrylate, 0.6 part of mixed tertiary mercaptans ($C_{10}$–$C_{14}$), 46 parts of butadiene, and another 27 parts of methyl methacrylate after reaching 17 g. of polymer per 100 g. of latex.

(II) Production of the chlorinated elastomers to be used (A) 100 parts of natural rubber having the Defo value 450 are dissolved in 2000 parts of carbon tetrachloride. At 50° C., chlorine is then conducted over the solution until 60–70 percent of chlorine are contained in the final product. The solution is then stirred for 24 hours at room temperature and subsequently a part of the solvent is distilled off in order to remove the excess chlorine and the dissolved hydrochloric acid. The solution is then precipitated by dropwise addition to hot water while stirring. The product dried at 60° C. can be dissolved in aliphatic or aromatic solvents.

(B) 100 g. of polybutadiene (or butadiene-styrene rubber) are dissolved in 2000 parts of chloroform. Chlorine is introduced into the solution at 60° C. until the final product contains 55 percent to 65 percent of chlorine. The solution is then stirred for another 24 hours at room temperature and finally a part of the solvent is distilled off in order to remove the excess chlorine and the dissolved hydrochloric acid. The solution is precipitated with methanol. The product dried at 60° C. can be dissolved in aliphatic or aromatic solvents.

Determination of the bonding strength values between rubber and metal

The rubber-metal bond was determined using circular elements. Cylindrical metal elements with a diameter of 30 mm. and a depth of 14 mm. and having a ½″ thread bore were used. To the external surface of these were applied rubber mixtures using bonding and auxiliary solutions vulcanized thereon after previous roughening or sand blasting. The test element has a cylindrical metal element which can consist of steel, iron, brass, bronze, electron or the like on each of its two outer surfaces, a core mixture with a depth of about 31 mm. being vulcanized between said surfaces. The test elements thus described are pressed in a two-part mould and vulcanized.

The prepared test elements are clamped by means of a half-inch collar-headed screw in the tension and compression testing machine No. 9080 in clamps designed especially for the purpose and separated from one another. The test element most frequently employed had a surface area of 7.07 cm.$^2$ and a diameter of 30 mm. In order to compare specimens of different diameters with one another, the strength values were converted to a value of 1 cm.$^2$. The test elements were separated with a feed of 50 mm./min.

Test conditions for the vulcanizing of mixtures onto metal

The metal was cleaned by sand-blasting, roughened and washed with trichloroethylene to remove grease. In all the tests hereinafter described, a coating of a 15 percent solution of chlorinated elastomer in xylene was first of all applied to the metal. After this coating has dried for about 30 minutes, the copolymer described is brushed on in the form of a 5 percent solution in trichloroethylene. In the mould described above, the test elements were vulcanized after drying for 30 minutes and pulled apart in the manner referred to. After this preliminary treatment, the following adhesion values with the metal are obtained, and as rubber mixtures, the following types are used:

EXAMPLE 1

Union between iron or brass and a cold-polymerized butadiene-styrene rubber.

Composition of the cold-polymerized butadiene-styrene rubber:

| | Parts |
|---|---|
| Cold-polymerized butadiene-styrene rubber | 100.0 |
| SAF-carbon black | 48.0 |
| Zinc oxide | 5.0 |
| Paraffinic plasticizer oil | 4.0 |
| Aromatic plasticizer oil | 4.0 |
| Coumarone resin | 2.0 |
| Paraffin | 0.6 |
| Stearic acid | 1.5 |
| Phenyl-α-naphthylamine | 1.0 |
| N-phenyl-N'-cyclohexyl-p-phenylene diamine | 1.0 |
| Sulphur | 1.8 |
| N-cyclohexyl-2-benzthiazyl sulphenamide | 1.25 |
| Tetramethyl thiuram monosulphide | 0.15 |

As bonding agent there was employed a mixture of a diolefine copolymer prepared according to I–A above and a chlorinated natural rubber according to II–A above in a ratio of 1:1.

Vulcanization conditions: 40 min./4.0 atm. gauge (151° C.). The average value of 5 different tests showed:

| | Kg./cm.$^2$ |
|---|---|
| With iron | 117 |
| With brass (MS 63) | 110 |
| With aluminium | 104 |

EXAMPLE 2

Union between iron or brass and a cold-polymerized butyl rubber.

Composition of the cold-polymerized butyl rubber:

| | Parts |
|---|---|
| Butyl rubber with average isoprene content | 100.0 |
| SRF-carbon black | 60.0 |
| Zinc oxide | 5.0 |
| Pinewood tar | 3.0 |
| p-Quinone dioxime | 4.0 |
| Dibenzthiazyl disulphide | 4.0 |
| Sulphur | 2.0 |

As bonding agent there was employed a mixture of a diolefine copolymer prepared according to I–A above and a chlorinated natural rubber according to II–A above in a ratio of 1:1.

Vulcanization conditions: 50 min./3.0 atm. gauge (143° C.). The average value of 5 different tests showed:

| | Kg./cm.$^2$ |
|---|---|
| With iron | 39.6 |
| With brass (MS 63) | 34.2 |

EXAMPLE 3

Union of rubber and a cold-polymerized butadiene-acrylonitrile rubber.

Composition of the cold-polymerized butadiene-acrylonitrile rubber:

| | Parts |
|---|---|
| Butadiene-acrylonitrile rubber with average acrylonitrile content | 100.0 |
| SRF-carbon black | 60.0 |
| Colophony | 1.0 |
| Zinc oxide | 20.0 |
| Sulphur | 3.0 |
| N-cyclohexyl-2-benzthiazyl sulphenamide | 0.8 |
| Phenyl-β-naphthylamine | 1.0 |

As bonding agent there was employed a mixture of a diolefine copolymer according to I–A above and a chlorinated natural rubber according to II–A above, in a ratio of 1:1.

Vulcanization conditions: 30 min./3.0 atm. gauge (143° C.). The average value of 5 different tests was 75.3 kg./cm.$^2$ with iron.

EXAMPLE 4

Union of iron and a cold-polymerized polychloroprene.

Composition of the cold-polymerized polychloroprene:

| | Parts |
|---|---|
| Polychloroprene, non-crystallizing types | 100.0 |
| HAF-carbon black | 50.0 |
| Paraffinic plasticiser | 6.0 |
| Zinc oxide | 5.0 |
| Stearic acid | 0.5 |
| Light-weight magnesia usta | 2.0 |
| Phenyl-α-naphthylamine | 2.0 |
| Sulphur | 1.0 |
| Tetramethylthiuram disulphide | 0.3 |

As bonding agent there was employed a mixture of a diolefine copolymer according to I–A above and a chlorinated natural rubber according to II–A above in a ratio of 1:1.

Vulcanization conditions: 30 min./3.0 atm. gauge (143° C.). The mean value of 5 different tests was 71.8 kg./cm.$^2$ with iron.

EXAMPLE 5

Union of iron and cold-polymerized butadiene-styrene-rubber as in Example 1. The butadiene methyl methacrylate copolymers were prepared according to method I–L above, the chlorinated natural rubber according to method II–A above.

Vulcanization conditions as given in Example 1.

| Parts of butadiene | Parts of methyl methacrylate | Average value of 5 tests (kg./cm.$^2$) |
|---|---|---|
| 10 | 90 | 8.0 |
| 20 | 80 | 24.0 |
| 30 | 70 | 34.5 |
| 40 | 60 | 58.2 |
| 50 | 50 | 51.0 |
| 60 | 40 | 74.2 |
| 70 | 30 | 33.7 |
| 80 | 20 | 26.0 |

EXAMPLE 6

Union of iron and cold-polymerized butadiene-styrene rubber as described in Example 1. The butadiene methyl methacrylate copolymers were prepared according to method I–A and the chlorinated polybutadiene according to method II–A. The ratio of diolefine copolymer/chlorinated polybutadiene was 1:1. Average value of 5 different tests:

| | Kg./cm.$^2$ |
|---|---|
| With iron | 62.0 |
| With aluminium | 46.3 |

EXAMPLE 7

Union of iron and cold-polymerized butadiene-styrene rubber as described in Example 1.

Bonding agent component 1: diolefine copolymer prepared according to method I–A.

Bonding agent component 2: after-chlorinated polychloroprene prepared according to method II–B.

The ratio of diolefine copolymer/after-chlorinated polychloroprene was 1:1. Average value of 5 different tests:

| | Kg./cm.$^2$ |
|---|---|
| With iron | 47.5 |
| With aluminium | 33.8 |

What we claim is:

1. A composite vulcanized structure comprising a metallic base member; a layer of a chlorinated elastomer having a chlorine content of at least 60% by weight adhered to said base member, said elastomer being selected from the group consisting of natural rubber, polybutadiene, polyisoprene and polychloroprene; a layer of a copolymer of butadiene with 40–70% by weight of methyl methacrylate adhered to said chlorinated elastomer and a vulcanizable rubbery material adhered to said butadiene copolymer layer, said rubbery material being selected from the group consisting of natural rubber and homopolymers and copolymers of butadiene, isoprene and chloroprene.

2. The composite vulcanized structure of claim 1 wherein said vulcanizable rubbery material is a polymerized conjugated aliphatic diolefine of from 4–6 carbon atoms containing at least 60% by weight of said diolefine.

3. The composite vulcanized structure of claim 1 wherein said copolymer of butadiene with 40–70% by weight of methyl methacrylate is a copolymer of said butadiene and 40–60% by weight of the total methyl methacrylate having grafted thereon the balance of said methyl methacrylate.

4. A method for bonding a metallic base member to a vulcanizable rubbery material selected from the group consisting of natural rubber and homopolymers and copolymers of butadiene, isoprene and chloroprene, said method comprising the steps of applying a chlorinated elastomer layer having a chlorine content of at least 60% by weight on a surface of the metallic base member, said elastomer being selected from the group consisting of natural rubber, polybutadiene, polyisoprene and polychloroprene; applying to the outer surface of said chlorinated elastomer layer, a layer of a copolymer of butadiene with 40–70% by weight of methyl methacrylate; bringing a surface of said vulcanizable rubbery material into intimate contact with the outer surface of said last layer and vulcanizing the thusly assembled structure at temperatures between 110 and 180° C.

5. A method for bonding a metallic base member to a vulcanizable rubbery material selected from the group consisting of natural rubber and homopolymers and copolymers of butadiene, isoprene and chloroprene, said method comprising the steps of applying a chlorinated elastomer layer having a chlorine content of at least 6% by weight to a surface of the metallic base member, said elastomer being selected from the group consisting of natural rubber, polybutadiene, polyisoprene and polychloroprene; applying to a surface of the vulcanizable rubbery material, a layer of a copolymer of butadiene with 40–70% by weight of methyl methacrylate; bringing the outer surface of said latter layer in intimate contact with the outer surface of said chlorinated elastomer layer and vulcanizing the thusly assembled structure at temperatures between 110 and 180° C.

References Cited

UNITED STATES PATENTS

| | | | |
|---|---|---|---|
| 2,278,802 | 4/1942 | Sarbach | 161—243 X |
| 2,418,025 | 3/1947 | Garvey | 161—243 X |
| 2,901,448 | 8/1959 | Kraus | 161—222 X |

MORRIS SUSSMAN, *Primary Examiner.*

WILLIAM A. POWELL, *Assistant Examiner.*

U.S. Cl. X.R.

161—222, 240, 243, 253, 255; 156—333, 338